United States Patent
Kellermann

(10) Patent No.: US 8,540,051 B2
(45) Date of Patent: Sep. 24, 2013

(54) SILENCER FOR A TWO-STROKE MOTOR OF A POWER TOOL

(75) Inventor: Christian Kellermann, Grande (DE)

(73) Assignee: Makita Corporation, Anjo-Shi (JP)

( * ) Notice: Subject to any disclaimer, the term of this patent is extended or adjusted under 35 U.S.C. 154(b) by 0 days.

(21) Appl. No.: 13/401,379

(22) Filed: Feb. 21, 2012

(65) Prior Publication Data

US 2012/0228053 A1    Sep. 13, 2012

(30) Foreign Application Priority Data

Mar. 9, 2011  (DE) ..................... 20 2011 000 534 U

(51) Int. Cl.
*F02M 35/00*  (2006.01)

(52) U.S. Cl.
USPC ............................ 181/229; 181/237; 181/212

(58) Field of Classification Search
USPC ................................................ 181/229, 237
See application file for complete search history.

(56) References Cited

U.S. PATENT DOCUMENTS

| | | | |
|---|---|---|---|
| 5,738,184 A * | 4/1998 | Masuda et al. ................ | 181/262 |
| 6,341,662 B1 * | 1/2002 | Karlsson ...................... | 181/230 |
| 7,527,126 B2 * | 5/2009 | Kuroda et al. ................ | 181/254 |
| 8,172,038 B2 * | 5/2012 | Kellermann ................... | 181/240 |
| 2001/0037912 A1 * | 11/2001 | Menzel ......................... | 181/231 |
| 2002/0152747 A1 * | 10/2002 | Blair et al. ..................... | 60/314 |
| 2006/0219203 A1 * | 10/2006 | Kellermann ............ | 123/184.57 |
| 2007/0137189 A1 * | 6/2007 | Kikuchi et al. ................. | 60/313 |

FOREIGN PATENT DOCUMENTS

| | | |
|---|---|---|
| DE | 20 2008 005 168 U | 10/2009 |
| EP | 2 221 458 A1 | 8/2010 |

OTHER PUBLICATIONS

German Search Report dated Jul. 28, 2011 in German Patent Application No. 20 2011 000 534.8 (with translation).
"Funktionsprinzip eines Zweitaktmotors," Schwabenkart, URL:http://schwabenkart.de/KnowHow/2Takte.htm, Nov. 15, 2004.
Jun. 20, 2013 European Search Report issued in European Application No. 12154952.1 with English-language translation.

* cited by examiner

Primary Examiner — Forrest M Phillips
(74) Attorney, Agent, or Firm — Oliff & Berridge, PLC

(57) ABSTRACT

A silencer for a two-stroke motor of a power tool, including a silencer inlet to which adjoins a flow channel of channel length so that the flow channel can be connected to an outlet of a combustion chamber of the two-stroke motor, whereby the flow channel at the channel end opposite the silencer inlet opens out into a first chamber of depth, between the silencer inlet and the first chamber the flow channel is so flow-beneficially designed, that due to its mass inertia the exhaust gas flowing into the silencer inlet predominantly flows into the first chamber and after filling the first chamber flows back again thereby creating a counterpressure in the direction of the combustion chamber, so that in spite of small geometric dimensions it provides a periodically actin counterpressure on the outlet of the combustion chamber of the two-stroke motor.

8 Claims, 2 Drawing Sheets

SILENCER FOR A TWO-STROKE MOTOR OF A POWER TOOL

The present invention relates a silencer for a two-stroke motor of a power tool, more particularly for a hand-operated power tool such as a gardening or park-tending tool, such as a chainsaw, and manual circular saw of a cutting grinder or for a moped, a boat motor and suchlike, whereby the silencer has a silencer inlet, to which a flow channel of channel length l adjoins so that by way of the silencer inlet the flow channel can be connected to an outlet of a combustion chamber of the two-stroke motor, whereby the channel end opposite the silencer inlet the flow channel opens out into a first chamber of depth t, whereby a second chamber is provided, into which the exhaust gas flows through a main outlet branched off from the flow channel, whereby the flow channel between the silencer inlet the first chamber is so flow-beneficially designed that due it its mass inertia the exhaust gas flowing into the silencer inlet predominantly flows into the first chamber and after filling the first chamber flows back, thereby creating a counterpressure in the direction of the combustion chamber in accordance with the introductory section of claim 1.

PRIOR ART

DE 20 2008 005 168 U1 shows a generic silencer arranged in a two-stroke motor as used in a gardening or park-tending tool or a hand-operated tool such as a chainsaw, a manual circular saw or a cutting grinder, or for a moped, a boat motor and suchlike. The shown silencer has a silencer inlet which is connected with the outlet of the combustion chamber of the two-stroke motor. Connected to the silencer inlet is a flow channel which via a channel end opens out into a first chamber. The flow channel and the first chamber are for example surrounded by a larger second chamber, whereby the first chamber can also be arranged outside the second chamber. To allow the exhaust gas to flow back towards the silencer inlet a flow connection in the form of a main outlet is shown, which extends perpendicularly away from the channel flow direction and opens out into the second chamber. Finally the exhaust gas can leave the second chamber through an outlet into the open air.

When building such silencers the aim 1s always to design the flow channel between the combustion chamber of the two-stroke motor and the first chamber so flow-beneficially that due to its mass inertia the exhaust gas flowing out of the outlet of the combustion chamber initially predominantly flows into the first chamber and does not already flow into the second chamber through the main outlet. Through the exhaust gas flowing into the first chamber the latter is filled until the exhaust gas creates an excess pressure in the first chamber. Due to the excess pressure the exhaust gas then flows from the first chamber through the flow channel back towards the silencer inlet. As a result, in the direction of the combustion chamber of the two-stroke motor a gas barrier can be formed in the form of a gas counterpressure, which reduces or even prevents a harmful subsequent emission of non-combusted fuel-air mixture. Non-combusted fuel-air mixture which has already reached the silencer can also be transported by the return exhaust gas flow to the combustion chamber of the two-stroke motor. Through this principle the exhaust gas values during operation of the two-stroke motor can be considerably improved and the consumption of fuel reduced.

From US 2002/0152747 A1 another silencer for a power tool is known and the silencer only has a first chamber which acts as a silencer and the exhaust gas can leave the first chamber through an outlet. In the flow channel between the outlet of the combustion chamber of the two-stroke motor and the first chamber there is a resonance pipe, which extends perpendicularly to the channel flow direction of the flow channel. The resonance pipe is closed at one end and during operation of the two-stroke motor a periodic pressure wave can be formed in the resonance pipe which is reflected at the closed end of the resonance pipe and flows back in the direction of the flow channel. This utilises the effect that the returning pressure wave creates a counterpressure towards the outlet of the combustion chamber to prevent non-combusted fuel-air mixture reaching the silencer, or fuel-air mixture that has already entered the flow channel can be transported back into the combustion chamber. However the drawback is that resonance pipes require lengths that are between around 40 cm and 70 cm.

DISCLOSURE OF THE INVENTION

In order to quality an arrangement of a two-stroke motor and a silencer for a number of hand-held power tools, it is desirable to further develop a silencer in such a way that in spite of small geometric dimensions it allow a periodically acting counterpressure on the outlet of the combustion chamber of the two-stroke motor.

This is achieved on the basis of a silencer for a two-stroke motor of a power tool in accordance with the introductory section of claim 2 in connection with the characterising features. Advantageous further embodiments of the invention are set out in the dependent claims.

The invention includes the teaching that the total length $L_{ges}$ from channel length l and depth t is less than the calculated length L in accordance with $$L = \frac{c_s \cdot \varphi}{12 \cdot n} \text{ in meters,}$$

where
$c_s$=Speed of sound of the hot exhaust gas (m/s)
$\varphi$=Crank angle in degrees from outlet opens to overflow channel closes
n=Speed in 1/min.

On the basis of the shown calculation method for determining the total length that can be used as the resonance length for a resonance pipe of a silencer, the invention utilises the idea of making the total length smaller than known from determining the total length in accordance with the prior art. The mathematical relationship is based on the speed of sound of the hot exhaust gas and the crank angle in degrees from opening the outlet to closing the overflow channel at a speed of in 1/min. More particularly the total length can correspond with a value of ⅛ to ⅓ of the calculated length.

The reduction in the total length based on the channel length and depth of the first chamber, which is the flow length, is only made possible by the silencer or the above-described type. This designs is characterised by the use of a first chamber at the end of the flow channel in that the first chamber forms an intermediate volume and in this intermediate volume the exhaust gas can form a temporary excess pressure, and after formation of the excess pressure flow back through the flow channel towards the silencer inlet. By appropriate selection of the volume of the first chamber and of the flow channel, in accordance with the invention a flow principle can be maintained with the formation of a gas barrier the outlet of the cylinders, in spite of the reduction in the known length to be calculated using the indicated equation. The principle of the present silencer differs from the resonator principle of the resonance pipe in the prior art in that there is no pressure wave that moves through an exhaust gas column towards a column end, is reflected at the column end to then move back through the column in order to form a pressure impulse at the silencer inlet for example, but an exhaust gas flow is present. This silencer principle utilises a volume which is formed by first chamber and lies at the end of the flow channel. It could be established that with appropriate selection of the volume and corresponding selection of the geometric, more particularly, flow-beneficial design of flow channel, the total length could be selected to be shorter than the length calculated with the indicated mathematical equation in accordance with the prior art. This achieves the advantage that in spite of retaining the gas barrier before the outlet of the cylinder the structural dimensions of the silencer can be kept much smaller, and the silencer can be used in two-stroke motors for power tools used in particular as hand-operated gardening and park-tending tool, manual tools such a chainsaws, circular saws or cutting grinders.

Advantageously the total length can be ⅛ to ⅓ of the value of he calculated length. If the calculated length is up to 60 cm for example, the total length from channel length l of the flow channel and the depth t of the first chamber can be around 7.5 to 20 cm. If the two-stroke motors are operated at speeds of, for example, 10,000 1/min or even more, the total length can be reduced even further, too, for example 7 cm or less.

Particularly advantageously the total length can be such that the ratio of the numerical value of the total length in centimeters to the numerical value of the capacity of the two-stroke motor in cubic centimeters is 0.15 to 0.35 more particularly less than 0.15 to 0.35. If for example the two-stroke motor has a capacity of 50 $cm^3$, the total length of the flow channel and the depth of the der first chamber can have a value of, for example, 17.5 cm to 7.5 cm, and, more particularly less than this.

The flow channel can be straight and extend along a channel flow direction, and the first chamber is arranged of the channel end of the flow channel in such a way that the centre of the first chamber is in extension of the channel flow direction. Alternatively the flow channel can be curved, or there is a bending element between the outlet of the combustion chamber and the inlet of the flow channel, whereby the first chamber can have a centre which is not in the channel flow direction, though the best results for creating the required flow principle in the exhaust gas are achieved if the centre of the first chamber is arranged in an extension of the channel flow direction and the flow channel is straight. More particularly the flow channel can extend in the same direction as the outlet in the cylinder of the two-stroke motor.

The flow channel can have a round cross-section whereby the first chamber is spherical. Especially due the spherical design of the first chamber the flow principle of the exhaust gas can be used over a greater speed range of the two-stroke, whereby the first chamber can alternative been of a conical, double conical or elliptical form and the principal axis of the ellipse can coincide with the channel flow direction. Alternatively the first chamber can also be quadratic or cylindrical and the axis of rotation of the cylinder coincides with the channel flow direction of the flow channel.

In accordance with a further advantageous form of embodiment the flow channel can for example be divided in sections into at least first partial channel and a second partial channel, whereby at least one valve is provided in at least one partial channel. More particularly a valve can be arranged in each of the partial channels, and for example through the first partial channel the exhaust gas can flow from the silencer inlet into the first chamber, and through the second partial channel exhaust gas can flow from the first chamber back towards the silencer inlet. Exhaust gas can thus flow through the first chamber in a preferred direction, particularly if the first partial channel is connected to the first chamber with local separation from the second partial channel. The at least one valve can be designed in various ways, for example as a Tesla valve, a flutter valve, a poppet valve and/or as a check valve.

A catalytic converter can also be provided in the flow channel and/or in the first chamber so that in addition to the improvement in the emission values of the power tool through the flow-beneficial design of the flow channel and the thus achieved exhaust gas flow effect, a further improvement in the exhaust gas values can be achieved in that at least one catalytic converter is integrated into the silencer of the above type. So that the exhaust gases of the two-stroke motor do not reach the environment without being cleaned, in addition to the flow-beneficial design of the flow channel and the effects this brings about, at least one catalytic converter is arranged in the silencer so that the exhaust gas partially or fully flow through the catalytic converter before they leave the silencer through the outlet and reach the open air. Particularly advantageous the catalytic converter can be designed as a honeycomb catalytic converter and be arranged in the flow channel or in the second chamber. Alternatively the catalytic converter can be designed as a grid catalytic converter and preferably be arranged in the first chamber.

A further improvement of the silencer is achieved through the measure that the ratio of the volume of the first chamber to the total volume of the silencer is ¼₀ to ½. The volumes in the silencer can be optimised in such a weay that while retaining the exhaust gas flow principle of maximum possible noise reduction is achieved during operation of the power tool. It has been shown with a volume of the first chamber at a ratio to the total volume of the silencer of ¼₀ to ½ the pressure oscillations at the outlet of the ilencer are particularly strongly reduced, so that operating noise of the power tool is quieter.

BRIEF DESCRIPTION OF THE DRAWINGS

Further measures that improve the invention are set out in more detail below together with a description of a preferred example of the invention with the aid of the drawings.

PREFERRED EXAMPLE OF EMBODIMENT OF THE INVENTION

Figure 1:
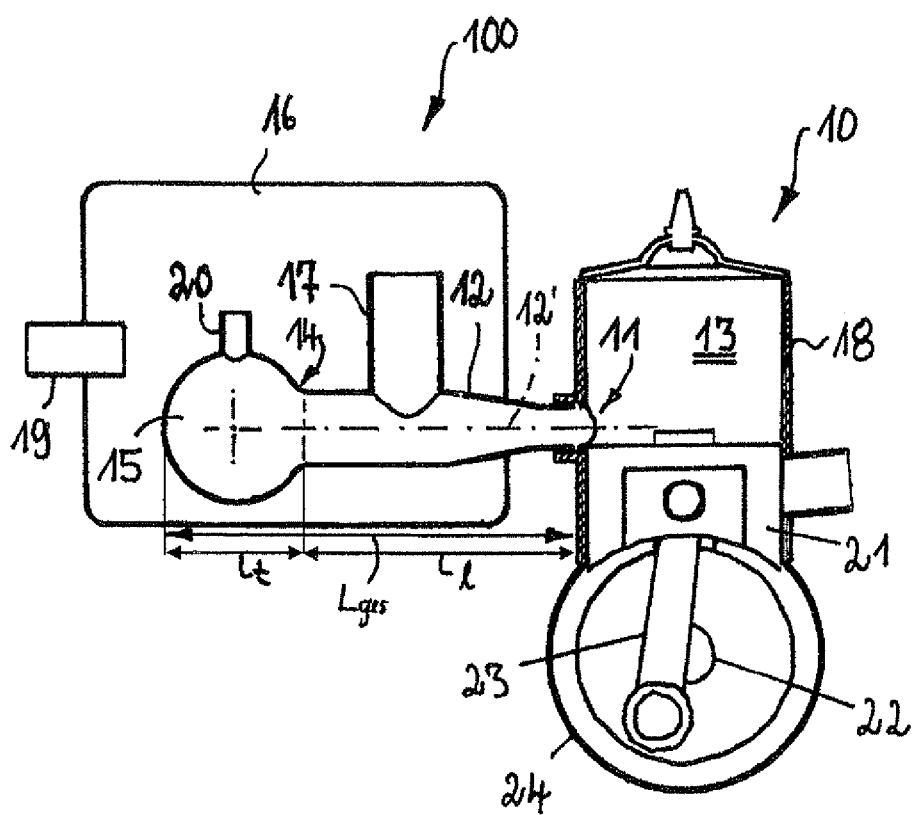
FIG. 1 shows an example of embodiment of a silencer with the features of the present invention and FIG. 2 shows the example of embodiment of the silencer with a flow channel comprising a first and a second partial channel.

FIG. 1 shows a silencer 100 arranged on a two-stroke motor 10 as can be used in a hand-held power tool. The two-stroke motor 10 has a cylinder 18 in which a combustion chamber 13 is formed. The combustion chamber 13 is movable defined by a piston 21, which via a connecting rod 23 it connected to a crankshaft 22 to form a crank assembly, and the crankshaft 22 is borne in a crank housing 24. Arranged in the wall of the cylinder 18 is an outlet to which the silencer 100 is connected via a silencer inlet 11 in a manner not shown in more detail. If the piston 21 is in the shown position of the lower dead centre, the piston 21 releases the outlet of the combustion chamber 13 and exhaust gas flow from the combustion chamber 13 through the silencer inlet 11 into the silencer 100. Connected to the silencer inlet 11 is a flow channel 12, which at a channel end 14, opposite the silencer inlet 11 opens out in to first chamber 15. The silencer 100 also has a second chamber 16 which is larger than the first chamber 15 and, for example, fully surrounds the first chamber 15, as well as a part of the flow channel 12.

The exhaust gas entering the silencer inlet 11 can at least initially large flow into the first chamber 15, whereby a main outlet 17 is arranged on the flow channel 12, and the exhaust gas flow from the flow channel 12 through the main outlet 17 into the second chamber 16. The first chamber 15 also has an optional secondary outlet 20, so that exhaust gas can also flow from first chamber 15 directly into the second chamber 16. The exhaust gas can leave the silencer 100 through an outlet 19 in the wall of the second chamber 16.

The flow channel 12 extends in a straight design between the first chamber 15 and the silencer inlet 11, and is thus so flow-beneficially designed that due to its mass inertia the exhaust gas flowing into the silencer inlet 11 predominantly flows into the first chamber 15 and creates an excess pressure therein. After filling the first chamber 15 the exhaust gas can flow back in the direction of the silencer inlet 11 thereby creating a counterpressure towards the combustion chamber 13. This prevents non-combusted fuel-air mixture reaching the silencer 100 or forces fuel-air mixture that has already entered the silencer 100 back into the combustion chamber 13. Only after flowing back of the exhaust gas to the outlet of the combustion chamber 13 can the exhaust gas leave the flow channel 12 and/or the first chamber 15 through a main outlet 17 and enter the second chamber 16 eintreten and leave the chamber 16 via outlet 19.

The flow channel 12 extends along a channel flow direction 12', and the flow channel 12 with a round cross-section is rotationally symmetrically around the channel flow direction 12'. The first chamber 15 is spherical and has a centre lying in an extension of the channel flow direction 12' so that the spherical first chamber 15 adjoins the flow channel 12 in the channel flow direction 12'. The flow channel 12 has a channel length l and the depth of the first chamber 15 in the channel flow direction 12' is t. The resulting total length $L_{ges}$ is the sum of the channel length l and the depth t of the chamber 15 and the total length $L_{ges}$ corresponds with an optimum exhaust gas flow length after the outlet of the cylinders 18 along which the exhaust gas can flow in the channel flow direction 12'.

In accordance with the invention the total length $L_{ges}$ can be less than the calculated length L in accordance with:

$$L = \frac{c_s \cdot \varphi}{12 \cdot n} \text{ in meters,}$$

where $c_s$=speed of sound of the hot exhaust gas (m/s)

$\varphi$=crank angle in degree from opening of the outlet to closing of the overflow channel n=Speed in 1/min.

If the speed of sound $c_s$ of the hot exhaust gas is 500 m/s for example, and the crank angle $\varphi$ in degrees over which the outlet of the combustion chamber 13 is opened, is 100 degrees, then with a speed n of 10,000 1/min a calculated total length L of 0.42 meters can be determined, so that in accordance with the invention the total length $L_{ges}$ is selected to be smaller. More particularly the total length $L_{ges}$ can be less than ⅛ to ⅓ of the calculated length L and have values of 5.25 to 14 cm.

Figure 2:
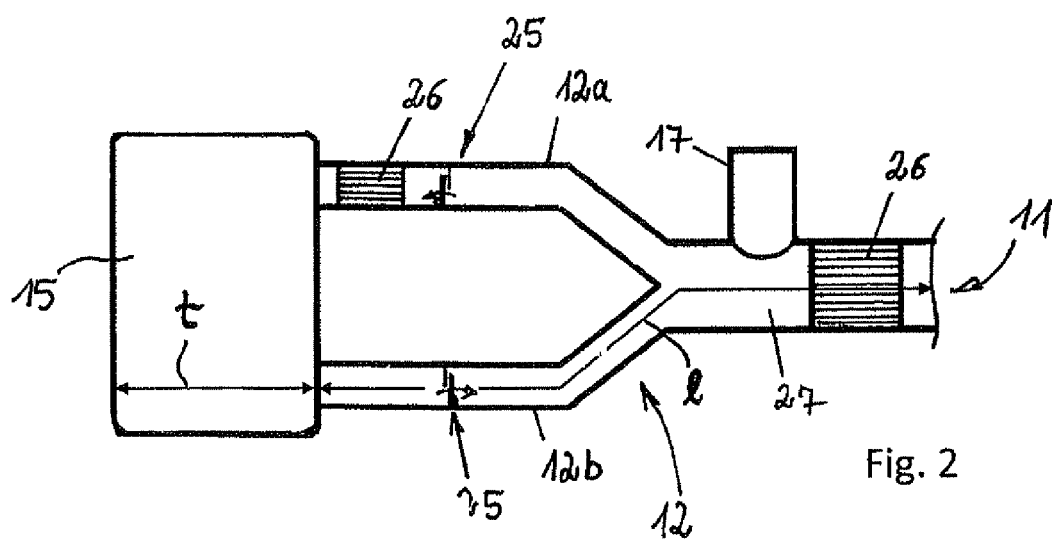

In FIG. 2 the flow channel 12 and the first chamber 15 of the silencer are shown, and in accordance with this example of embodiment the flow channel 12 is divided into a first partial channel 12a and second partial channel 12b, and the partial channels 12a and 12b open out at a distance from each other into the first chamber 15, which as a rectangular cross-section for example. The channel length l is determined by the length of each of the partial channels 12a and 12b as well as the length of a connection piece 27, and the main outlet 17 is arranged for example on the connection piece 27. The partial channels extend between the connection piece 27 and the first chamber 15, and the depth of the first chamber 15 is given as depth t.

In the channel, valve 25, for example in the form of check valves, are shown and the opening direction of the valves 25 is determined so that the flow passes through the first partial channel 12a from the silencer inlet 11 in the direction of the first chamber 15, and through the second partial channel 12b from the first chamber 15 in the direction of the silencer inlet 11. Also, by way of example, catalytic converters 26 are shown and a first catalytic converter 26 is located in the connection piece 27 and a second catalytic converter 26 is shown located for example in the first partial channel 12a and can be seen as an additional and preferably as an alternative arrangement. The sound-proofing principle can also be implemented with a branched channel 12, whereby in accordance with a further alternative the first partial channel 12a can run in the channel flow direction 12' until the latter opens up into the first chamber 15 and the second partial channel 12b can deviate from the channel flow direction 12' and thus form a secondary channel for the return flow of the exhaust gas from the first chamber 15 towards the silencer inlet 11.

The invention is not restricted in its implementation to the above preferred example of embodiment. Rather, a large number of variants are conceivable which use the shown solution even in fundamentally different type of embodiment. All features and/or advantages including design details and spatial arrangements evident from the claims, the description or the drawings can be essential to the invention in themselves or in various combinations.

| List of references | |
|---|---|
| 100 | Silencer |
| 10 | Two-stroke motor |
| 11 | Silencer inlet |
| 12 | Flow channel |
| 12' | Channel flow direction |
| 12a | First partial channel |
| 12b | Second partial channel |
| 13 | Combustion chamber |
| 14 | Channel end |
| 15 | First chamber |
| 16 | Second chamber |
| 17 | Main outlet |
| 18 | Cylinder |
| 19 | Outlet |
| 20 | Secondary outlet |
| 21 | Piston |
| 22 | Crankshaft |
| 23 | Connecting rod |
| 24 | Crank housing |
| 25 | Valve |
| 26 | Catalytic converter |
| 27 | Connection piece |
| l | Channel length |
| t | Depth of the chamber |
| L | Calculated length |
| $L_{ges}$ | Total length from l and t |

The invention claimed is:

1. A silencer for a two-stroke motor of a power tool, comprising:

a silencer inlet that adjoins a flow channel having a flow channel length to an outlet of a combustion chamber of the two-stroke motor;

a first chamber having a first chamber depth, an end of the flow channel opposite to the silencer inlet opening into the first chamber; and a second chamber into which exhaust gas flows through a main outlet branched from the flow channel, the second chamber having an outlet from which the exhaust gas flows, wherein due to the inertial mass of the exhaust gas, the exhaust gas first flows into the silencer inlet, predominantly filling the first chamber, and after filling the first chamber, the exhaust gas flows back towards the combustion chamber, creating a counterpressure in a direction of the combustion chamber;

wherein a total length including the flow channel length and the first chamber depth is less than a calculated length L determined in accordance with:

$$L = \frac{c_s \cdot \varphi}{12 \cdot n} \text{ in meters}$$

where $c_s$=Speed of sound of the hot exhaust gas (m/s)

$\varphi$=Crank angle in degrees from opening of the outlet of the combustion chamber to closing of the flow channel n=Motor Speed in 1 rev/min.

2. The silencer in accordance with claim 1, wherein the total length corresponds to a value of ⅛ to ⅓ of the calculated length L.

3. The silencer in accordance with claim 1, wherein the total length is such that the ratio of the numerical value of the total length in centimeters to the numerical value of a capacity of the two-stroke motor in cubic centimeters is 0.15 to 0.35.

4. The silencer in accordance with claim 1, wherein the flow channel extends along a flow channel direction and the first chamber is arranged at the end of the flow channel such that the centre of the first chamber is approximately in a position corresponding to an extension from a centre of the flow channel.

5. The silencer in accordance with claim 1, wherein the flow channel has a round cross-section, and the first chamber is spherical.

6. The silencer in accordance with claim 1, wherein the flow channel is at least in section divided into a first partial channel and a second partial channel, and at least one valve is provided in at least one partial channel.

7. The silencer in accordance with claim 1, wherein a catalytic converter is arranged in the flow channel and/or in the first chamber.

8. The silencer in accordance with claim 1, wherein a ratio of a volume of the first chamber to a total volume of the silencer is between 1/40 and ½.

* * * * *